(12) United States Patent
Gedin et al.

(10) Patent No.: US 12,378,917 B2
(45) Date of Patent: Aug. 5, 2025

(54) SUN GEAR FOR A MECHANICAL REDUCTION GEAR OF AN AIRCRAFT TURBOMACHINE

(71) Applicant: SAFRAN TRANSMISSION SYSTEMS, Colombes (FR)

(72) Inventors: Patrice Jocelyn Francis Gedin, Moissy-Cramayel (FR); Guillaume Julien Beck, Moissy-Cramayel (FR); Loïc Francois, Moissy-Cramayel (FR); Boris Pierre Marcel Morelli, Moissy-Cramayel (FR); Jordane Emile André Peltier, Moissy-Cramayel (FR); Antoine Jacques Marie Pennacino, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/679,923

(22) Filed: May 31, 2024

(65) Prior Publication Data

US 2025/0027454 A1     Jan. 23, 2025

(30) Foreign Application Priority Data

Jun. 1, 2023 (FR) ...................... 2305494

(51) Int. Cl.
*F16H 57/08* (2006.01)
*F02C 7/36* (2006.01)

(52) U.S. Cl.
CPC .............. *F02C 7/36* (2013.01); *F16H 57/08* (2013.01); *F05D 2220/323* (2013.01); *F05D 2260/40311* (2013.01)

(58) Field of Classification Search
CPC .... F16H 57/08; F16H 55/14; F05D 2220/323; F05D 2260/40311; F02C 7/36
See application file for complete search history.

(56) References Cited

U.S. PATENT DOCUMENTS 3,361,002 A * 1/1968 Staehlin .................. F16H 55/18
74/440
2002/0014133 A1 2/2002 Kimizuka
(Continued)

FOREIGN PATENT DOCUMENTS

DE 112019000782 T5 11/2020
DE 102021201862 A1 9/2022

OTHER PUBLICATIONS

French Search Report—Written Opinion mailed Dec. 12, 2023, issued in Application No. FR 2305494, filed Jun. 1, 2023, 7 pages.

*Primary Examiner* — Tisha D Lewis
(74) *Attorney, Agent, or Firm* — CHRISTENSEN O'CONNOR JOHNSON KINDNESS PLLC

(57) ABSTRACT

A sun gear for a mechanical gearbox of an aircraft turbomachine, the sun gear having an annular shape around an axis and including an internal annular part having at its internal periphery coupling grooves, an external annular part having at its external periphery at least one meshing tooth, the external part extending around the internal part, and an annular veil connecting the internal and external parts. At least one of the internal and external parts can include two independent rings, each having grooves or teeth, and the veil can have two annular branches connected respectively to the two rings.

23 Claims, 12 Drawing Sheets

(56) References Cited

U.S. PATENT DOCUMENTS

2021/0039620 A1 2/2021 Mitsugi et al.
2021/0388769 A1* 12/2021 Beck ....................... F16H 57/08
2023/0130860 A1* 4/2023 Piazza ....................... F01D 1/24
                                                           415/1

* cited by examiner

SUN GEAR FOR A MECHANICAL REDUCTION GEAR OF AN AIRCRAFT TURBOMACHINE

CROSS-REFERENCE(S) TO RELATED APPLICATION(S)

This application claims priority to FR 2305494, filed Jun. 1, 2023, the disclosure of which is hereby expressly incorporated by reference herein in its entirety.

TECHNICAL FIELD

The present disclosure relates to the field of the mechanical reduction gears for turbomachines, for example, turbomachines for an aircraft.

BACKGROUND

The prior art includes the documents WO-A1-2010/092263, FR-A1-2 987 416, FR-A1-3 008 462, DE-A1-10 2021 201862, DE-T5-11 2019 000782, US-A1-2022/014133 and FR-A1-3 041 054.

The role of a mechanical reduction gear is to modify the speed and torque ratio between the input axle and the output axle of a mechanical system.

The new generations of double flow turbomachines, in particular those with a high bypass ratio, comprise a mechanical reduction gear to drive the shaft of a fan. The usual purpose of the reduction gear is to convert the rotational speed referred to as high speed of the shaft of a power turbine into a slower rotational speed for the shaft driving the fan.

Such a reduction gear comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reduction gear architectures. In the prior art of the double flow turbomachines, the reduction gears are of the planetary or epicyclic type. In other similar applications, there are architectures referred to as differential or "compound."

In a planetary reduction gear, the planet carrier is stationary and the ring gear is the output shaft of the device which rotates in the opposite orientation of the sun gear.

In an epicyclic reduction gear, the ring gear is stationary and the planet carrier is the output shaft of the device which rotates in the same orientation as the sun gear.

On a compound reduction gear, no element is fixed in rotation. The ring gear rotates in the opposite orientation of the sun gear and of the planet carrier.

The reduction gears can consist of one or more meshing stages. This meshing is ensured in different ways such as by contact, friction or magnetic field.

There are several types of contact meshing such as straight, helical or herringbone toothings.

One of the problems with a reduction gear of this type is the absorption of external forces and manufacturing faults, which must be compensated for by flexibility at the interfaces.

In this application, "flexibility" is intended to mean the ability of a piece or part of a piece to deform elastically in order to absorb forces, for example, when transmitting torque.

By "interface" we mean a connection between two pieces, which can be, for example, a meshing connection (via one or more toothings, for example) or a coupling (via splines).

In current technology, it is known to provide flexibility at the input shaft of the reduction gear or at the interface between the input shaft and the sun gear.

The input shaft comprises a tubular end which is engaged with the sun gear and which comprises splines for coupling with complementary splines of the sun gear. This shaft can comprise a flexible that is generally in the form of a bellows, giving the shaft the ability to deform elastically in bending or torsion.

Alternatively, an intermediate connecting piece between the input shaft and the sun gear can comprise a flexibility.

These technologies are not entirely satisfactory, however, as they generally result in an imbalance in the transmission of forces to the sun gear and therefore in inhomogeneous loading of the toothing of the sun gear. On the contrary, it is preferable to distribute the charges evenly over the teeth of the sun gear in order to limit the stresses to which the sun gear is subjected during operation.

Embodiments of the present disclosure offer simple, effective and economical solutions to this problem.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure relates to a sun gear for a mechanical reduction gear (6) of an aircraft turbomachine, this sun gear having an annular shape around an axis and comprising:
  an inner annular part comprising coupling splines at its inner periphery,
  an outer annular part comprising at its outer periphery at least one meshing toothing, this outer part extending around the inner part, and
  an annular web connecting the inner and outer parts, this web being located between the inner and outer parts and having a shape giving the sun gear a capacity for deformation, for example, in bending,
  wherein:
    at least one of the inner and outer parts comprises two independent rings, each comprising splines or a toothing, and
    the web comprises two annular legs connected respectively to these two rings.

The present disclosure thus proposes to provide flexibility directly in the sun gear. This flexibility is provided by the web connecting the inner and outer parts of the sun gear. Advantageously, the web gives the sun gear flexibility in the radial and axial directions, i.e. the rings are able to move radially with respect to each other and therefore to move out of alignment. This displacement is made possible by elastic deformation of the web, which thus absorbs forces during the transmission of a rotation torque.

The solution proposed below is compatible:
(1) with a single or multi-stage reduction gear;
(2) with a planetary, epicyclic or compound reduction gear, of straight, helical or herringbone toothings;
(3) of any type of planet carrier, whether it is a single part or of the cage and cage carrier type; and/or
(4) any type of planet gear bearing, whether made up of rolling elements, hydrodynamic bearings, etc. among other compatibilities.

The sun gear according to embodiments of the present disclosure may comprise one or more of the following characteristics, taken in isolation from each other, or in combination with each other:
   the inner part comprises two inner rings comprising splines at their inner periphery, the web comprising two legs connected respectively to the inner rings;
   the outer part comprises two outer rings, each of which comprises a toothing at its outer periphery, the web comprising two legs connected respectively to the outer rings; the two legs extend from the inner part to the outer part;
   the two legs are parallel to each other and perpendicular to the axis;
   the two legs which are connected to the inner rings are connected by a single bulkhead to the outer part, or the two legs which are connected to the outer rings are connected by a single bulkhead to the inner part;
   the single bulkhead is perpendicular to the axis and connected to the middle of the outer or inner part;
   the two legs are frustoconical and forming a V-shape in axial section;
   the web is generally Y-shaped in axial section;
   the two inner legs are connected to the two outer legs substantially in the middle of the web, i.e. halfway between the inner and outer parts;
   the two inner legs are connected to the two outer legs by an annular wire of the web or by a cylindrical wall of the web;
   the two legs of the web are connected by a cylindrical wall of the web;
   the web is generally X- or H-shaped in axial section;
   the web is made in a single piece;
   the sun gear is made in a single piece;
   the web is formed in one piece with at least one part of each of the inner and outer parts;
   the rings of the inner part are at axial distance from each other, and/or the rings of the outer part are at axial distance from each other;
   the axial distance between the rings of the inner part is greater than or equal to the axial dimension of each of the rings of the inner part;
   the axial distance between the rings of the outer part is less than or equal to the axial dimension of each of the rings of the outer part;
   the axial distance between the rings of the inner part is different from the axial distance between the rings of the outer part; for example, the axial distance between the rings of the inner part is greater than the axial distance between the rings of the outer part; and/or
   the rings of the inner part are independent so as to be able to move independently of each other, and/or the rings of the outer part are independent so as to be able to move independently of each other.

Embodiments of the present disclosure also relate to a mechanical reduction gear for an aircraft turbomachine, this reduction gear comprising:
   a planet carrier comprises a first axis of rotation,
   a sun gear as described above which is mounted in the planet carrier and is centered on the first axis,
   a ring gear extending around the sun gear and the first axis, and
   planet gears carried by the planet carrier and meshing with the sun gear and the ring gear, the planet gears comprising second axes of rotation parallel to the first axis.

The present disclosure also relates to a turbomachine, for example, a turbomachine for an aircraft, comprising a mechanical reduction gear or a sun gear as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
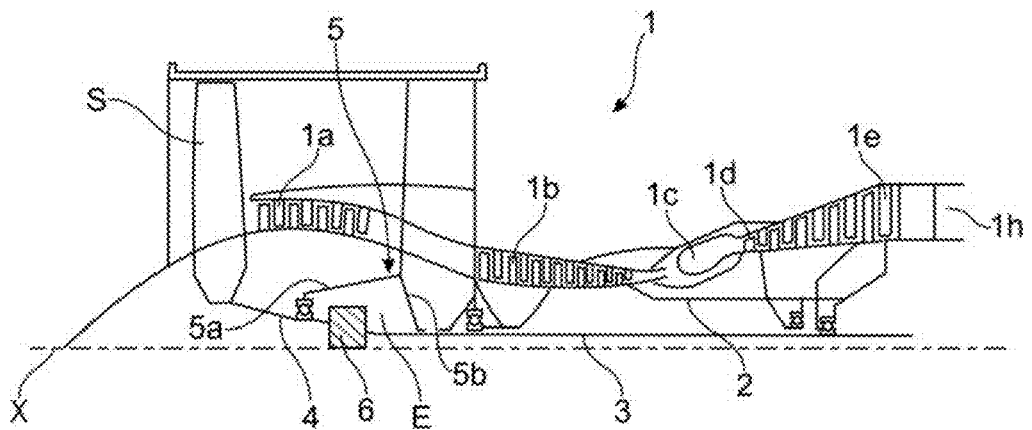
FIG. 1 is a schematic axial sectional view of a turbomachine according to aspects of the present disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by a reduction gear 6. This reduction gear 6 is generally of the planetary or epicyclic type.

The following description relates to a reduction gear of the epicyclic type, in which the planet carrier and the sun gear are mobile in rotation, the ring gear of the reduction gear being stationary in the reference frame of the engine.

The reduction gear 6 is positioned in the upstream part of the turbomachine. A stationary structure comprising schematically, here, an upstream part 5a and a downstream part 5b which makes up the engine casing or stator 5 is arranged so as to form an enclosure E surrounding the reduction gear 6. This enclosure E is here closed upstream by seals at the level of a bearing allowing the passage of the fan shaft 4, and downstream by seals at the level of the passage of the LP shaft 3.

Figure 2:
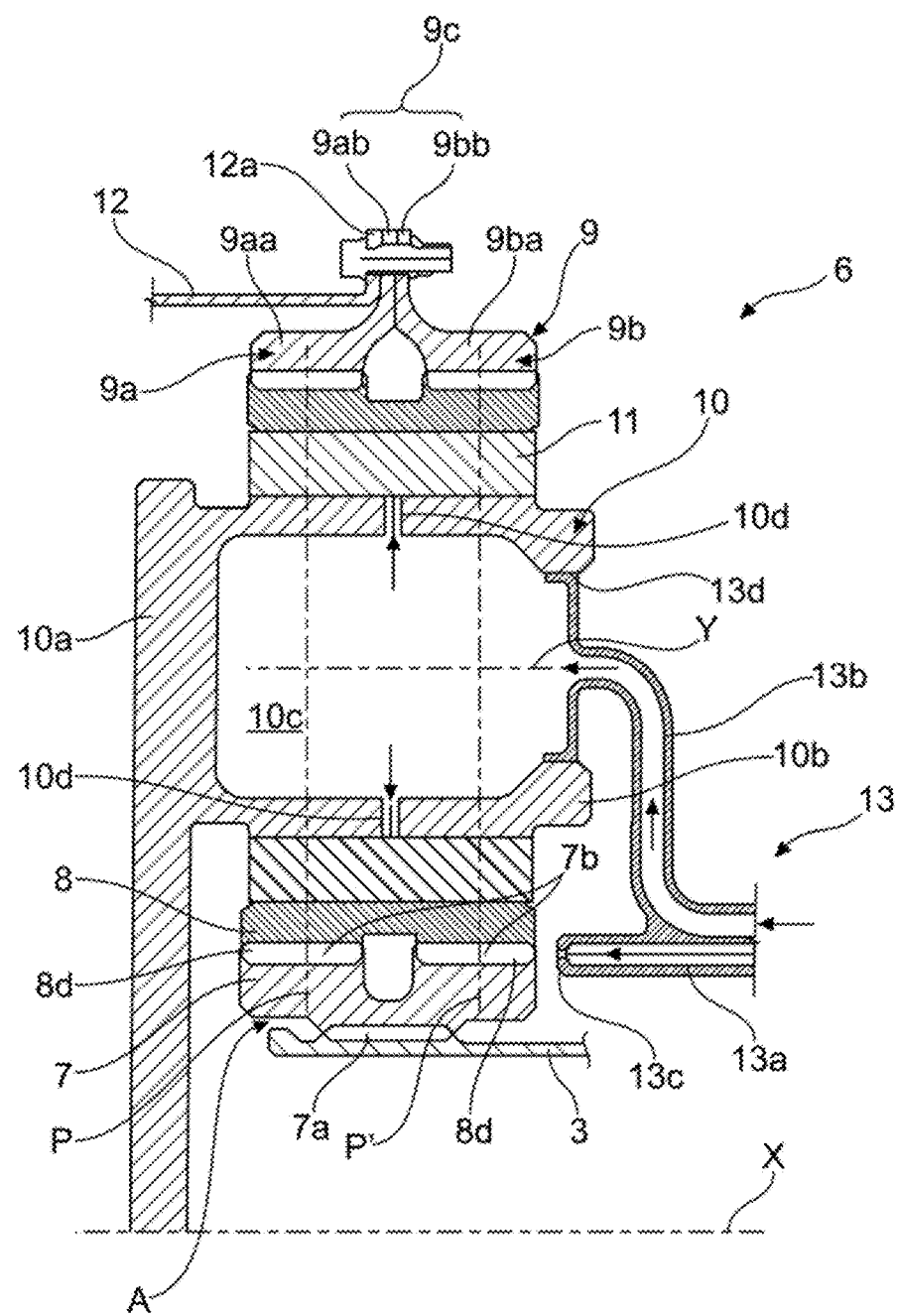
FIG. 2 is a partial axial sectional view of a mechanical reduction gear.

FIG. 2 shows an epicyclic reduction gear 6. In the inlet, the reduction gear 6 is connected to the LP shaft 3, for example by inner splines 7a. Thus, the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

Alternatively, the planet gears 8 may not be equally spaced around the axis X.

The assembly of the planet gears 8 is held by a frame referred to as planet carrier 10. Each planet gear 8 rotates around its own axis Y and meshes with the ring gear 9.

In the output there are several potential configurations, among others.

In an epicyclic configuration, the assembly of planet gears 8 drives the planet carrier 10 in rotation about the axis X of the turbomachine. The ring gear is attached to the engine casing or stator 5 via a ring gear carrier 12 and the planet carrier 10 is attached to the fan shaft 4.

In another planetary configuration, the assembly of the planet gears 8 is held by a planet carrier 10 which is attached to the engine casing or stator 5. Each planet gear 8 drives the ring gear which is fitted to the fan shaft 4 via a ring gear carrier 12.

In another differential configuration, the assembly of the planet gears 8 is held by a planet carrier 10 which is connected to a first fan shaft 5. Each planet gear 8 drives the ring gear which is fitted to a second counter-rotating fan shaft 4 via a ring gear carrier 12. Other configurations are within the scope of the present disclosure.

Each planet gear 8 is mounted free in rotation by a bearing 11, for example of the rolling or hydrodynamic bearing type. Each bearing 11 is mounted on one of the axles 10b of the planet carrier 10 and all axles are positioned relative to each other using one or more structural frame 10a of the planet carriers 10. There are a number of axles 10b and bearings 11 equal to the number of planet gears. For reasons of operation, mounting, manufacture, inspection, repair or replacement, the axles 10b and the frame 10a can be separated into several pieces.

For the same reasons mentioned above, the toothing of a planet gear can be separated into several propellers or teeth each with a median plane P, P'. In our example, we detail the operation of a reduction gear in which each planet gear comprises two series of herringbone teeth cooperating with a ring gear separated into two half-ring gears:

an upstream half-ring gear 9a consisting of a rim 9aa and a mounting half-flange 9ab. On the rim 9aa is the front propeller meshed with a propeller of the toothing 8d of each planet gear 8. The propeller of the toothing 8d also meshes with that of the sun gear 7.

A downstream half-ring gear 9b consisting of a rim 9ba and a mounting half-flange 9bb. On the rim 9ba is the rear propeller meshed with a propeller of the toothing 8d of each planet gear 8. The propeller of the toothing 8d also meshes with that of the sun gear 7.

If the propeller widths vary between the sun gear 7, the planet gears 8 and the ring gear 9 because of the toothing overlaps, they are all centered on a median plane P for the upstream teeth and on another median plane P' for the downstream teeth.

FIG. 2 thus illustrates the case of a meshing single-stage reduction gear 6, i.e. a same toothing 8d of each planet gear 8 cooperates with both the sun gear 7 and the ring gear 9. Even though the toothing 8d comprises two series of teeth, these teeth have the same average diameter and form a single toothing referred to as herringbone.

The mounting half-flange 9ab of the upstream ring gear 9a and the mounting half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by a bolted mounting, for example.

The arrows in FIG. 2 describe the conveying of the oil in the reduction gear 6. The oil enters the reduction gear 6 from the stator part 5 into a turbine stator vane 13 by different means which will not be specified in this view because they are specific to one or more types of architecture. The turbine stator vane 13 comprises injectors 13a and arms 13b.

The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and circulates via the supply mouth 13d of the bearing. The oil then circulates through the axle into one or more buffer areas 10c and exit out through the orifices 10d in order to lubricate the bearings of the planet gears.

In the previous technique shown in FIG. 2, a sun gear 7 of reduction gear comprises an annular body extending around the axis X and comprising at its inner periphery the splines 7a for coupling with the shaft 3, and at its outer periphery a toothing 7b for meshing with the toothing 8d of each planet gear 8. The splines 7a are located in a central through bore A in the body which is centered on the axis X.

Figure 3:
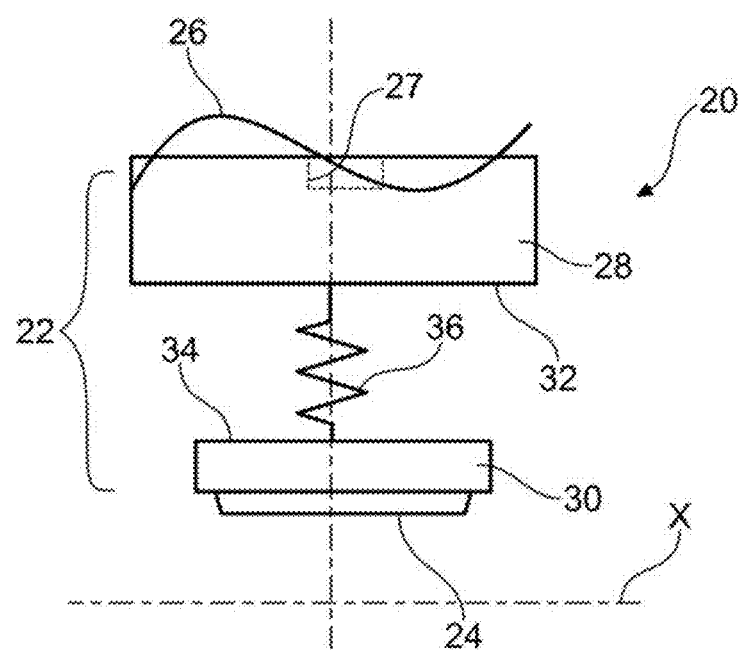
FIG. 3 is a very schematic partial view in axial section of a sun gear for an aircraft mechanical reduction gear.
Figure 4:
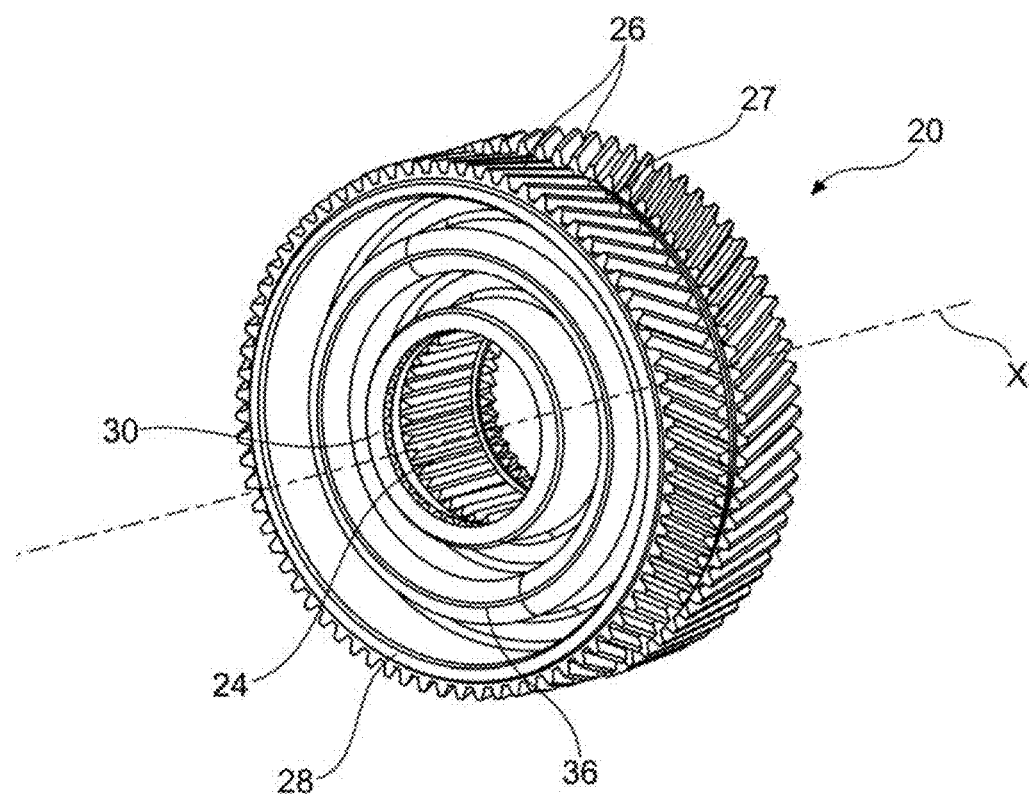
FIG. 4 is a schematic perspective view of a sun gear for an aircraft mechanical reduction gear.
Figure 5:
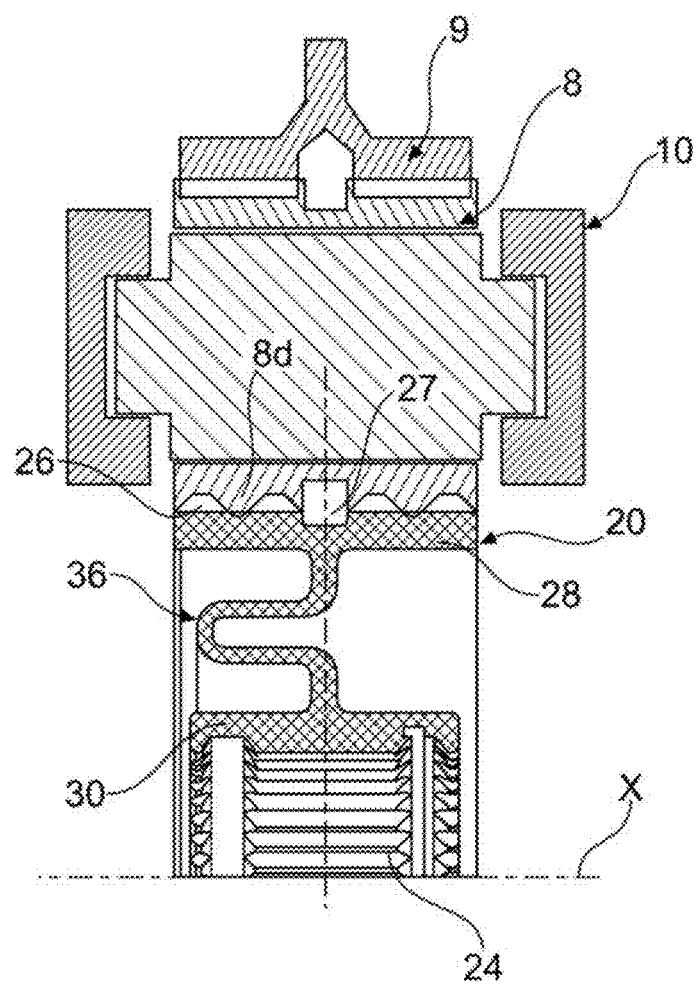
FIG. 5 is a schematic axial sectional view of an aircraft mechanical reduction gear comprising the sun gear shown in FIG. 4.

FIGS. 3 to 5 schematically illustrate a sun gear comprising an elastic deformation capacity in operation.

The sun gear 20 comprises an annular body 22 extending around the axis X and comprising at its inner periphery the splines 24 for coupling with the shaft 3, and at its outer periphery a toothing 26 for meshing with the toothing 8d of each planet gear 8.

The body 22 has the particularity of comprising two rings, respectively an outer ring 28 and an inner ring 30, which are coaxial and extend around each other.

The outer ring 28 comprises the aforementioned toothing 26 at its outer periphery. This toothing 26 may comprise two series of adjacent teeth separated axially from each other by an annular groove 27 opening radially outwards. Both series of teeth have the same diameter and can be herringbone-shaped.

The outer ring 28 comprises at its inner periphery an inner surface 32, for example cylindrical.

The inner ring 30 comprises the aforementioned splines 24 at its inner periphery. These splines 24 are, for example, straight or rectilinear and parallel to the axis X.

The inner ring 30 comprises an outer surface 34, for example cylindrical, on its outer periphery.

The body 22 also comprises an annular connecting web 36 which is located between the rings 28, 30, and in some embodiments, between the surfaces 32, 34.

FIGS. 6 to 12 illustrate several embodiments of the present disclosure.

The sun gear 50 according to the present disclosure has an annular shape around an axis X and comprises:
- an inner annular part 52 comprising coupling splines 53 at its inner periphery,
- an outer annular part 54 comprising at least one meshing toothing 56 at its outer periphery, this outer part 54 extending around the inner part 52, and
- an annular web 58 connecting the inner and outer parts 52, 54, this web 58 being located between the inner and outer parts 52, 54 and having a shape giving the sun gear 50 an elastic deformation capacity.

The splines 53 are configured to be coupled with complementary splines on an input shaft of the reduction gear, as described above.

The toothing 56 are configured to mesh with complementary planet gear toothing of the reduction gear, as described above.

According to the present disclosure:
- at least one of the inner and outer parts 52, 54 comprises two independent rings each comprising splines 53 or a toothing 56, and
- the web 58 comprises two annular legs connected respectively to these two rings.

Figure 6:
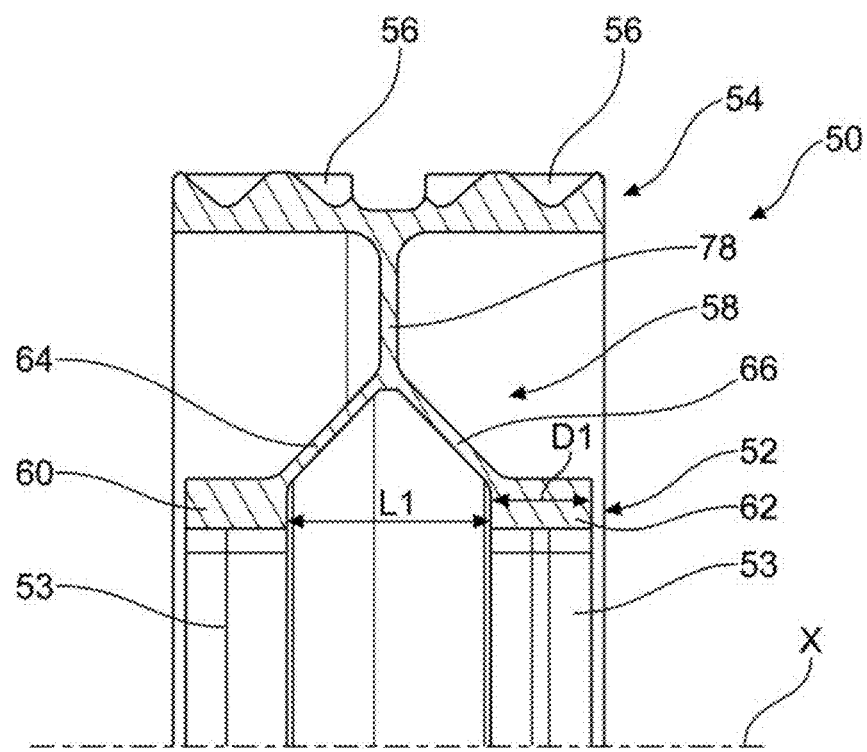
FIG. 6 is a partial schematic view of a sun gear in axial section; according to one embodiment of the present disclosure.

In the embodiment shown in FIG. 6, it is the inner part 52 of the ring 50 which comprises two inner rings 60, 62. These rings 60, 62 comprise splines 53 at their inner periphery. The web 58 comprises two inner legs 64, 66 connected respectively to the inner rings 60, 62.

At their outer periphery, the two legs 64, 66 are connected by a single bulkhead 68 to the outer part 54. This single bulkhead 68 is perpendicular to the axis X and connected to the middle of the outer part 54.

In the example shown, the two legs 64, 66 are frustoconical and form a V shape in axial section, with the opening pointing radially inwards, i.e. towards the axis X. The web 58 has a general Y shape in axial section, which is inverted here.

The axial distance L1 between the rings 60, 62 is greater than the axial dimension D1 of each of these rings.

Figure 7:
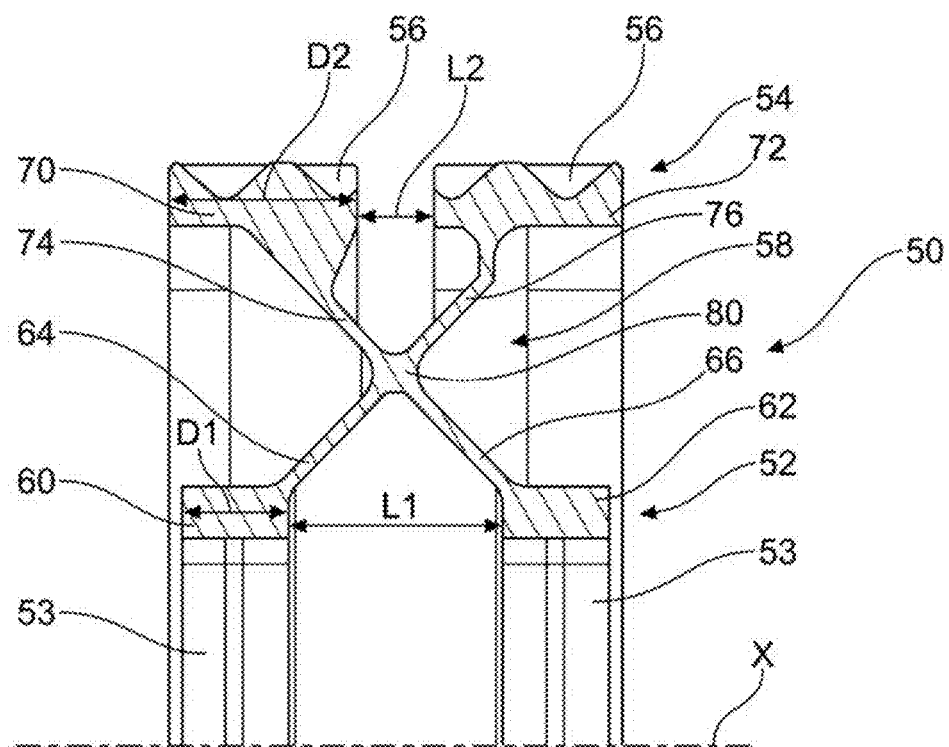
FIG. 7 is a partial schematic view of a sun gear in axial section; according to a variant of the embodiment of the present disclosure.

In the embodiment shown in FIG. 7, each of the inner and outer parts 52, 54 of the ring 50 comprises two rings, inner 60, 62 and outer 70, 72 respectively. The rings 60, 62 of the inner part 52 comprise splines 53 at their inner periphery. The rings 70, 72 of the outer part 54 each comprise a toothing 56 at their outer periphery. The web 58 comprises two inner legs 64, 66 connected respectively to the inner rings 60, 62, and two outer legs 74, 76 connected respectively to the outer rings 70, 72.

The two inner legs 64, 66 are connected to the two outer legs 74, 76 substantially in the middle of the web 58, i.e. halfway between the inner and outer parts 52, 54.

In the example shown, the two inner legs 64, 66 are connected to the two outer legs 74, 76 by an annular wire 78 of the web 58, i.e. by an annular part of the web with small dimensions in the axial and radial directions.

Again in the example shown, each of the legs 64, 66, 74, 76 has a generally frustoconical shape. The web 58 is generally X-shaped in axial section, or the legs 64, 66, 74 and 76 are X-shaped in axial section.

The axial distance L1 between the rings 60, 62 is greater than the axial dimension D1 of each of these rings. The axial distance L2 between the rings 70, 72 is less than the axial dimension D2 of each of these rings. In the example shown, L1 is greater than L2

Figure 8:
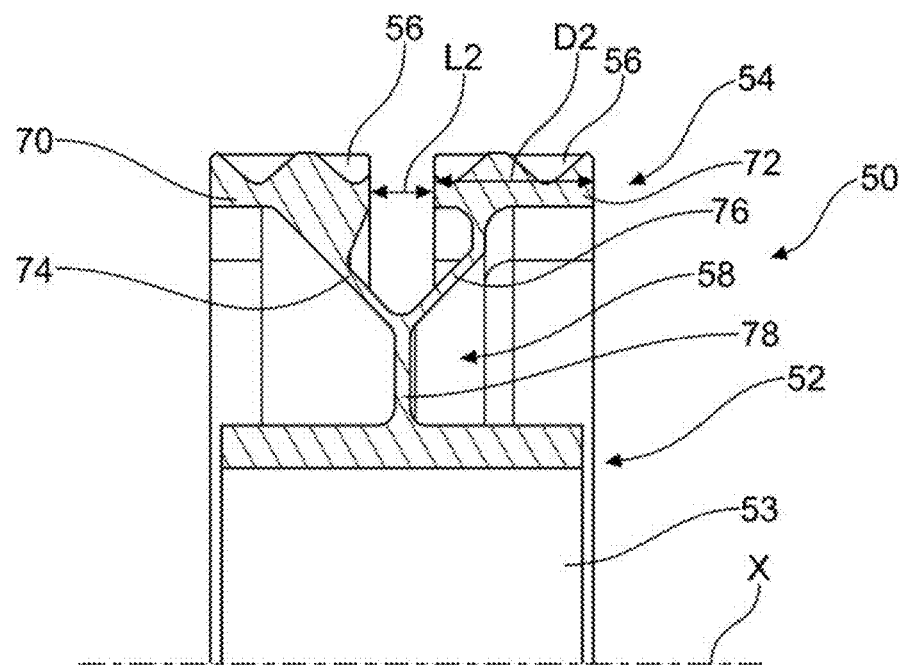
FIG. 8 is a partial schematic view of a sun gear in axial section; according to another variant of the embodiment of the present disclosure.

In the embodiment shown in FIG. 8, it is the outer part 54 of the ring 50 which comprises two outer rings 70, 72. These rings 70, 72 each comprise a toothing 56 on their inner periphery. The web 58 comprises two outer legs 74, 76 connected respectively to the outer rings 70, 72.

At their inner periphery, the two legs 74, 76 are connected by a single bulkhead 78 to the inner part 52. This single bulkhead 78 is perpendicular to the axis X and connected to the middle of the inner part 52.

In the example shown, the two legs 74, 76 are frustoconical and form a V shape in axial section. The web 58 is generally Y-shaped in axial section.

The axial distance L2 between the rings 70, 72 is less than the axial dimension D2 of each of these rings.

Figure 9:
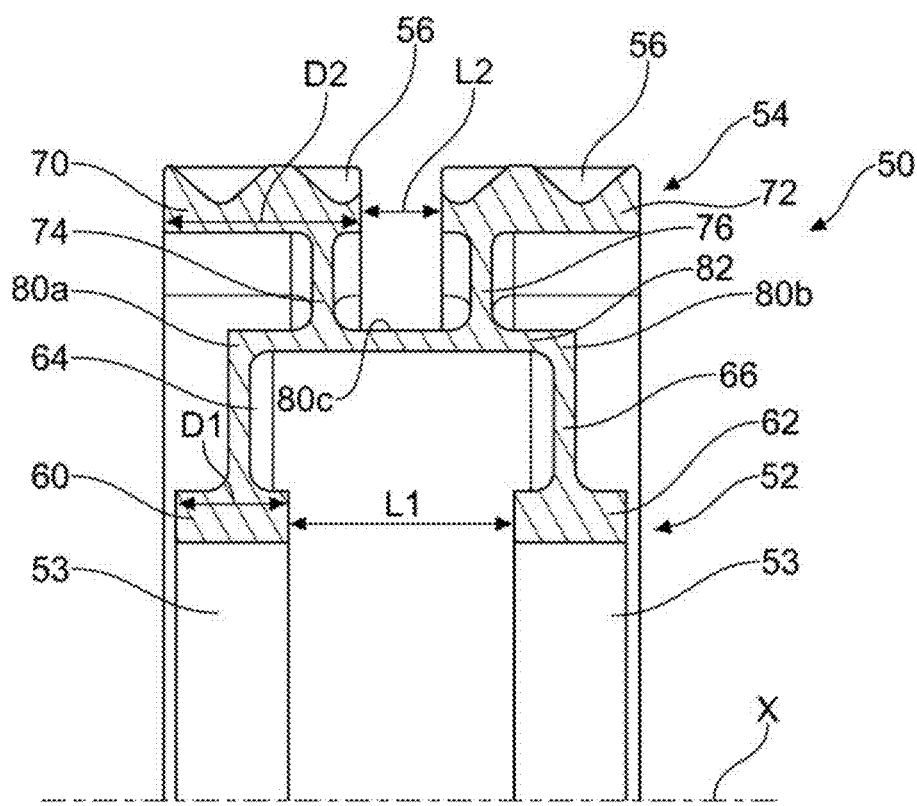
FIG. 9 is a partial schematic view of a sun gear in axial section; according to another variant of the embodiment of the present disclosure.

In the embodiment shown in FIG. 9, each of the inner and outer parts 52, 54 of the ring 50 comprises two rings, inner 60, 62 and outer 70, 72 respectively. The rings 60, 62 of the inner part 52 comprise splines 53 at their inner periphery. The rings 70, 72 of the outer part 54 each comprise a toothing 56 at their outer periphery. The web 58 comprises two inner legs 64, 66 connected respectively to the inner rings 60, 62, and two outer legs 74, 76 connected respectively to the outer rings 70, 72.

The two inner legs 64, 66 are connected to the two outer legs 74, 76 substantially in the middle of the web 58, i.e. halfway between the inner and outer parts 52, 54.

In the example shown, the two inner legs 64, 66 are connected to the two outer legs 74, 76 by a cylindrical wall 80 of the web 58 which is centered on the axis X.

The free annular edges 80a, 80b of this wall 80 are connected respectively to the outer peripheries of the inner legs 64, 66. The legs 74, 76 extend from the outer cylindrical surface 80c of the wall 80 to the outer rings 70, 72.

Again in the example shown, each of the legs 64, 66, 74 and 76 has a radial orientation and is therefore perpendicular to the axis X. The web 58 is generally H-shaped in axial section.

The axial distance L1 between the rings 60, 62 is greater than the axial dimension D1 of each of these rings. The axial distance L2 between the rings 70, 72 is less than the axial dimension D2 of each of these rings. In the example shown, L1 is greater than L2.

Figure 10:
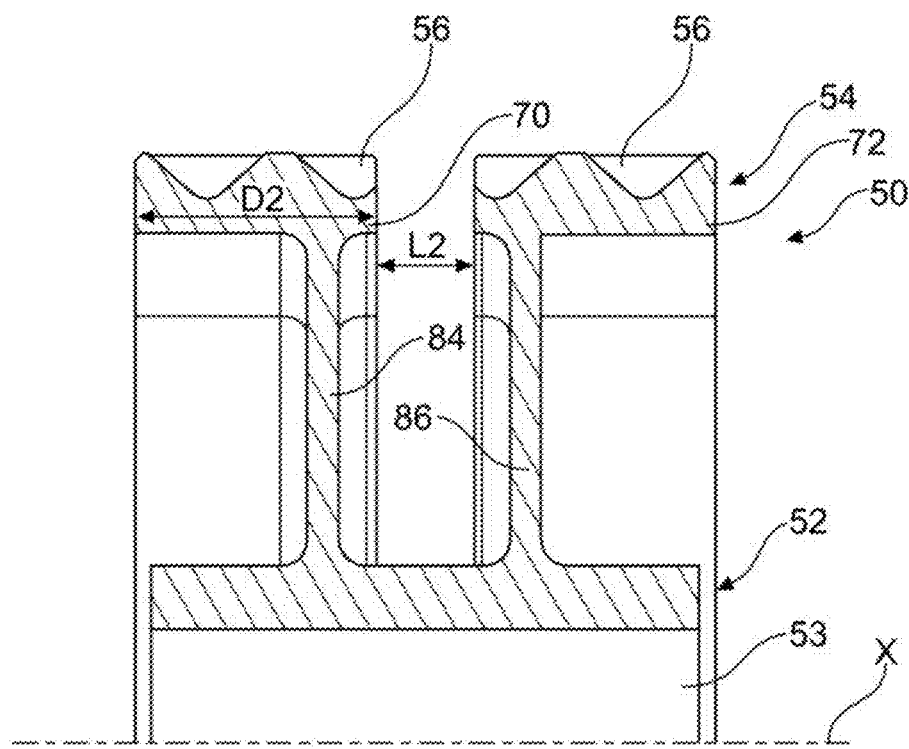
FIG. 10 is a partial schematic view of a sun gear in axial section; according to another variant of the embodiment of the present disclosure.

In the embodiment shown in FIG. 10, it is the outer part 54 of the ring 50 which comprises two outer rings 70, 72. These rings 70, 72 comprise toothing 56 on their outer periphery. The web 58 comprises two legs 84, 86 connected respectively to the outer rings 70, 72.

The web 58 is formed by these two legs 84, 86 which extend from the outer part 54 to the inner part 52.

At their inner periphery, the two legs 84, 86 are connected to an outer cylindrical surface of the inner part 52.

The axial distance L2 between the rings 70, 72 is less than the axial dimension D2 of each of these rings.

Figure 11:
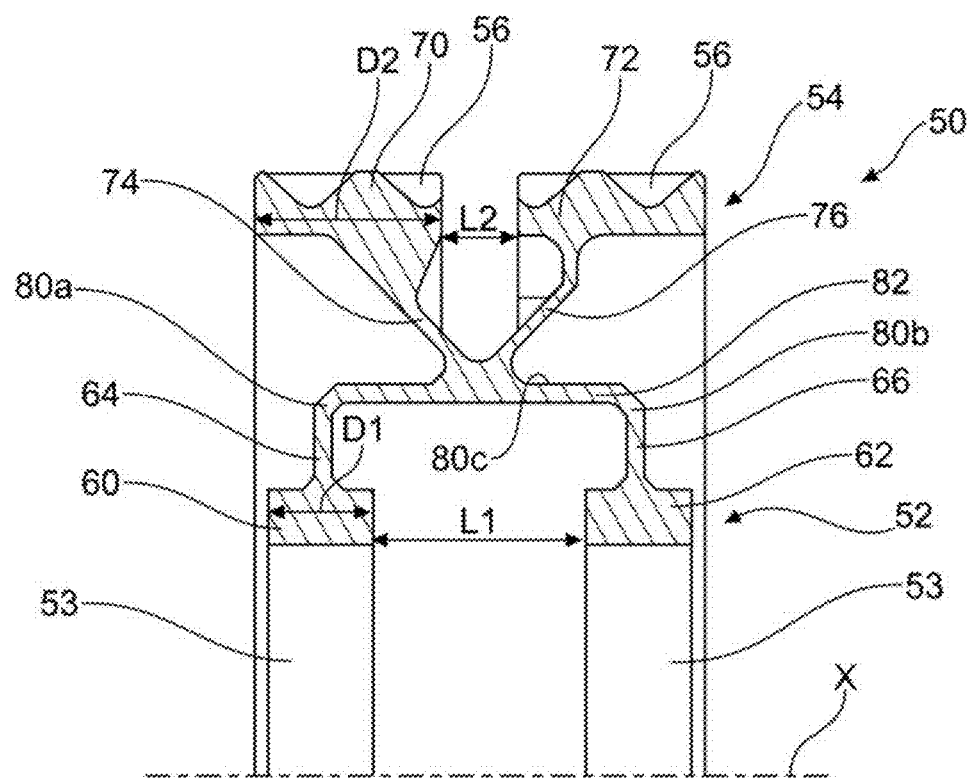
FIG. 11 is a partial schematic view of a sun gear in axial section; according to another variant of the embodiment of the present disclosure.

In the embodiment shown in FIG. 11, each of the inner and outer parts 52, 54 of the ring 50 comprises two rings, inner 60, 62 and outer 70, 72 respectively. The rings 60, 62 of the inner part comprises splines 53 at their inner periphery. The rings 70, 72 of the outer part each comprise a toothing 56 at their outer periphery. The web 58 comprises two inner legs 64, 66 connected respectively to the inner rings 60, 62, and two outer legs 74, 76 connected respectively to the outer rings 70, 72.

The two inner legs 64, 66 are connected to the two outer legs 74, 76 substantially in the middle of the web 58, i.e. halfway between the inner and outer parts 52, 54.

In the example shown, the two inner legs 64, 66 are connected to the two outer legs 74, 76 by a cylindrical wall 80 of the web 58.

Again in the example shown, each of the legs 74, 76 has a generally frustoconical shape and each of the legs 64, 66 is perpendicular to the axis X.

The free annular edges 80a, 80b of the wall 80 are connected respectively to the outer peripheries of the inner legs 64, 66. The legs 74, 76 extend from the middle of the outer cylindrical surface 80c of the wall 80 to the outer rings 70, 72.

The web 58 is generally H-shaped in axial section.

The axial distance L1 between the rings 60, 62 is greater than the axial dimension D1 of each of these rings. The axial distance L2 between the rings 70, 72 is less than the axial dimension D2 of each of these rings. In the example shown, L1 is greater than L2.

Figure 12:
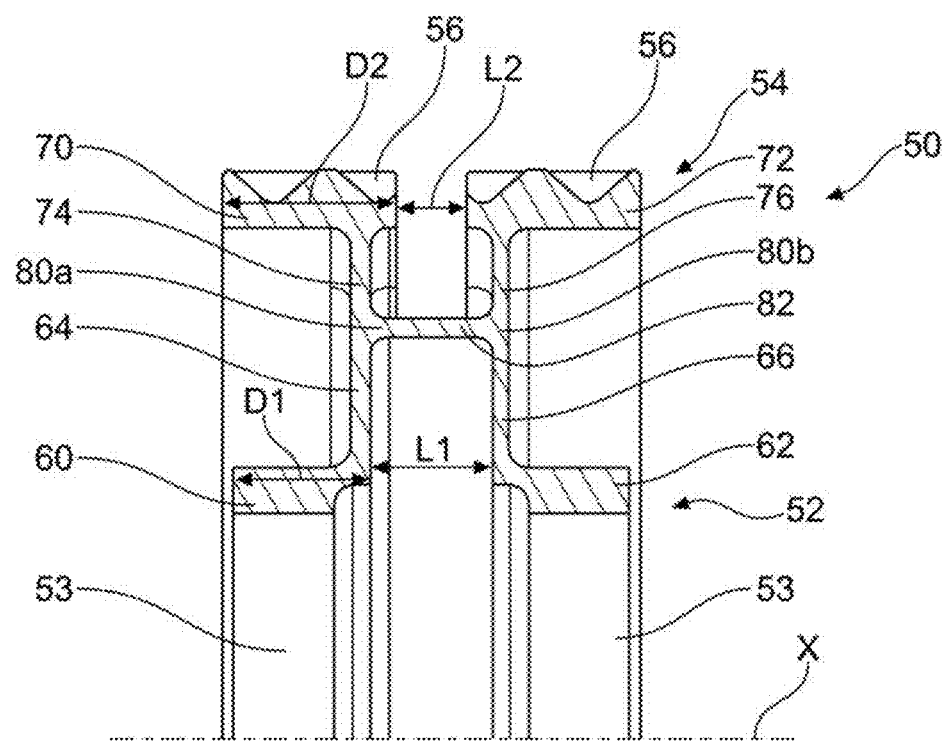
FIG. 12 is a partial schematic view of a sun gear in axial section, according to another variant of the embodiment of the present disclosure.

In the embodiment shown in FIG. 12, each of the inner and outer parts 52, 54 of the ring 50 comprises two rings, inner 60, 62 and outer 70, 72 respectively. The rings 60, 62 of the inner part 52 comprise splines 53 at their inner periphery. The rings 70, 72 of the outer part each comprise a toothing 56 at their outer periphery. The web 58 comprises two inner legs 64, 66 connected respectively to the inner rings 60, 62, and two outer legs 74, 76 connected respectively to the outer rings 70, 72.

The two inner legs 64, 66 are connected to the two outer legs 74, 76 substantially in the middle of the web 58, i.e. halfway between the inner and outer parts 52, 54.

In the example shown, the two inner legs 64, 66 are connected to the two outer legs 74, 76 by a cylindrical wall 80 of the web 58.

The free annular edges 80a, 80b of this wall 80 are connected respectively to the outer peripheries of the inner legs 64, 66. The free annular edges 80a, 80b are also connected to the inner peripheries of the outer legs 74, 76 respectively.

Again in the example shown, each of the legs 64, 66, 74 and 76 has a radial orientation and is therefore perpendicular to the axis X. The web 58 is generally H-shaped in axial section.

The axial distance L1 between the rings 60, 62 is greater than or equal to the axial dimension D1 of each of these rings. The axial distance L2 between the rings 70, 72 is less than the axial dimension D2 of each of these rings. In the example shown, L1 is greater than L2

Regardless of its embodiment, the web 58, or even preferably the sun gear 50, can be formed in one piece, for example by additive manufacturing, machining or metal casting.

The thicknesses of the web 58 and its legs are chosen according to the flexibility required and the torque to be transmitted.

In some embodiments, the toothings 56 can be straight or herringbone.

In some embodiments, the splines 53 can be curved, centered, and could even be shrunk or held in place with a nut. Sufficient flexibility makes it easier to size the toothing while retaining the add-on splines.

The present disclosure provides several advantages, including:
  it takes advantage of the available space so as not to clutter up the rest of the engine, and/or
  it allows you to take advantage of add-on splines while retaining axial freedom.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by The embodiments of the invention in which an exclusive property jor privilege is claimed are defined as follows:

1. A sun gear for a mechanical reduction gear of an aircraft turbomachine, the sun gear having an annular shape about an axis, the sun gear comprising:
   an inner annular part including coupling splines at its inner periphery;
   an outer annular part having at its outer periphery at least one meshing toothing, the outer part extending around the inner part; and
   an annular web connecting the inner and outer parts, the annular web being located between the inner and outer parts and having a shape giving the sun gear a capacity for elastic deformation,
   wherein the inner part includes two independent rings each having splines, and/or the outer part includes two independent rings each having a toothing, and
   wherein the web has two annular legs connected respectively to the two rings.

2. The sun gear according to claim 1, wherein the inner part further comprises two inner rings including splines at their inner periphery, and wherein the annular web further comprises two legs connected respectively to the inner rings.

3. The sun gear according to claim 2, wherein the two legs extend from the inner part to the outer part.

4. The sun gear according to claim 3, wherein the two legs are parallel to each other and perpendicular to the axis.

5. The sun gear according to claim 2, wherein the two legs which are connected to the inner rings are connected by a single bulkhead to the outer part, or the two legs which are connected to the outer rings are connected by a single bulkhead to the inner part.

6. The sun gear according to claim 5, wherein the single bulkhead is perpendicular to the axis and connected to the middle of the outer or inner part.

7. The sun gear according to claim 5, wherein the two legs are frustoconical and form a V-shape in axial section.

8. The sun gear according to claim 5, wherein the annular web is generally Y-shaped in axial section.

9. The sun gear according to claim 2, wherein the two inner legs are connected to the two outer legs substantially in the middle of the annular web.

10. The sun gear according to claim 9, wherein the two legs of the annular web are connected by a cylindrical wall of the annular web.

11. The sun gear according to claim 9, wherein the annular web is generally X- or H-shaped in axial section.

12. The sun gear according to claim 1, wherein the outer part further comprises two outer rings each having a toothing at their outer periphery, and wherein the annular web further comprises two legs connected respectively to the outer rings.

13. The sun gear according to claim 12, wherein the two legs extend from the inner part to the outer part.

14. The sun gear according to claim 13, wherein the two legs are parallel to each other and perpendicular to the axis.

15. The sun gear according to claim 12, wherein the two legs which are connected to the inner rings are connected by a single bulkhead to the outer part, or the two legs which are connected to the outer rings are connected by a single bulkhead to the inner part.

16. The sun gear according to claim 15, wherein the single bulkhead is perpendicular to the axis and connected to the middle of the outer or inner part.

17. The sun gear according to claim 15, wherein the two legs are frustoconical and form a V-shape in axial section.

18. The sun gear according to claim 15, wherein the annular web is generally Y-shaped in axial section.

19. The sun gear according to claim 12, wherein the two inner legs are connected to the two outer legs substantially in the middle of the annular web.

20. The sun gear according to claim 19, wherein the two legs of the annular web are connected by a cylindrical wall of the annular web.

21. The sun gear according to claim 19, wherein the annular web is generally X- or H-shaped in axial section.

22. The sun gear according to claim 1, wherein the annular web is made in a single piece.

23. A mechanical reduction gear for an aircraft turbomachine, the reduction gear comprising:
   a planet carrier including a first axis of rotation;
   a sun gear according to claim 1 which is mounted in the planet carrier and which is centered on the first axis;
   a ring gear extending around the sun gear and the first axis; and
   planet gears carried by the planet carrier and meshing with the sun gear and the ring gear, the planet gears have second axes of rotation parallel to the first axis.

* * * * *